(12) United States Patent
Wang

(10) Patent No.: US 11,760,474 B2
(45) Date of Patent: Sep. 19, 2023

(54) VTOL BOX-WING MULTIROTOR AERIAL VEHICLE

(71) Applicant: Xi Wang, Saint-Laurent (CA)

(72) Inventor: Xi Wang, Saint-Laurent (CA)

( * ) Notice: Subject to any disclaimer, the term of this patent is extended or adjusted under 35 U.S.C. 154(b) by 80 days.

(21) Appl. No.: 17/340,079

(22) Filed: Jun. 6, 2021

(65) Prior Publication Data

US 2022/0388648 A1   Dec. 8, 2022

(51) Int. Cl.

| | | |
|---|---|---|
| *B64C 29/00* | (2006.01) | |
| *B64C 39/06* | (2006.01) | |
| *B64C 9/00* | (2006.01) | |
| *B64C 25/32* | (2006.01) | |
| *B64C 5/00* | (2006.01) | |
| *B64C 11/48* | (2006.01) | |
| *B64C 39/04* | (2006.01) | |

(52) U.S. Cl.
CPC ............ *B64C 29/0033* (2013.01); *B64C 5/00* (2013.01); *B64C 9/00* (2013.01); *B64C 11/48* (2013.01); *B64C 25/32* (2013.01); *B64C 39/04* (2013.01); *B64C 39/068* (2013.01); *B64C 2009/005* (2013.01)

(58) Field of Classification Search
CPC ......... B64C 29/0033; B64C 5/00; B64C 9/00; B64C 11/48; B64C 25/32; B64C 39/04; B64C 39/068; B64C 5/06
See application file for complete search history.

(56) References Cited

U.S. PATENT DOCUMENTS

| | | | | |
|---|---|---|---|---|
| 2,388,380 | A * | 11/1945 | Bathurst | B64C 1/22 220/1.5 |
| 4,143,841 | A * | 3/1979 | Roeder | B64D 25/12 244/140 |
| 4,358,072 | A * | 11/1982 | Williamson | B64C 37/00 244/234 |
| 7,344,110 | B2 * | 3/2008 | Giannakopoulos | B64D 25/12 244/140 |
| 11,077,937 | B1 * | 8/2021 | Bruell | B64C 29/0033 |
| 11,167,848 | B2 * | 11/2021 | Duffy | B60P 1/649 |
| 11,247,783 | B1 * | 2/2022 | Jeng | B64C 29/0033 |
| 2011/0079166 | A1 * | 4/2011 | Popa-Simil | B60K 16/00 180/2.2 |
| 2015/0266571 | A1 * | 9/2015 | Bevirt | B64C 29/0033 244/7 C |
| 2020/0269975 | A1 * | 8/2020 | Fink | B64C 29/0033 |

(Continued)

*Primary Examiner* — Joshua J Michener
*Assistant Examiner* — Cindi M Curry

(57) ABSTRACT

A VTOL (vertical take-off and landing) box-wing aerial vehicle with multirotor to provide VTOL flight includes a detachable cabin, centered fuselage, a pair of first wings extending outward from the upper portion of the fuselage and a pair of second wings extending outwardly and from the lower portion of the fuselage. The first and second wings are spaced apart longitudinally and vertically. The pylon joints the first wing and second wing at the tip to form the box-wing. The pylon includes heading control rudder. Secured to the wing or pylon or both wing and pylon, an overhead boom extending longitudinally to support a plurality of lift rotors or tiltable rotors for VTOL flight. Finally, the overhead boom mounted tiltable rotors propel the vehicle forward to generate lift from the wings. Furthermore, the wings are equipped with elevators and ailerons for flight control.

12 Claims, 7 Drawing Sheets

100

(56) References Cited

U.S. PATENT DOCUMENTS

| | | | |
|---|---|---|---|
| 2020/0407055 A1* | 12/2020 | Mores | B64C 29/0025 |
| 2021/0362866 A1* | 11/2021 | Tian | B64D 27/24 |
| 2022/0041280 A1* | 2/2022 | Tian | B64U 50/13 |
| 2022/0089279 A1* | 3/2022 | Rosen | B64C 29/0033 |

* cited by examiner

VTOL BOX-WING MULTIROTOR AERIAL VEHICLE

CROSS-REFERENCE TO RELATED APPLICATIONS

| U.S. PATENT DOCUMENTS | | |
|---|---|---|
| 3,053,480 | Oct. 6, 1959 | Edward G. Vanderlip |
| 3,834,654 | Sep. 10, 1974 | Luis R. Miranda |
| 5,503,352 | Apr. 2, 1996 | Vladimir S. Eger |
| 2018/0305005 | Oct. 25, 2018 | Robert W. Park |
| 10/364,036 B6 | Jul. 30, 2019 | James Joseph Tigh |
| 2020/0317353 A1 | Oct. 8, 2020 | JoeBen Bevirt |
| 10/981,650 B2 | Apr. 20, 2021 | Axel Fink, D |
| 10/994,829 B2 | May 4, 2021 | Michael J. Duffy |
| FOREING PATENT DOCUMENTS | | |
| EP3098161B1 | May 24, 2016 | Judas, Micheal |

BACKGROUND ON INVENTION

1. Field of the Invention

The disclosed invention relates to a VTOL (vertical take-off and landing) box-wing aerial vehicle, and more specifically to the configuration of the box-wing airframe configurated with multiple rotary wings for VTOL flight and the tiltable rotor for forward flight.

2. Discussion of the State of the Art

The helicopter is an essential modern air transportation vehicle. Technically, helicopter with rotary wing is also referred as "rotorcraft" or "rotary wing vehicle". The rotary wing is commonly referred as "rotor". Rotary wing positioned in the center of a shroud is called "ducted fan". In general, rotary wing comprising of a plurality of blades rotating on the same axis. The rotary movement of the blades works as the air mover to generate thrust. The rotary wing permits the helicopter to land and take-off vertically without the presence of a long run way. Disadvantageously, helicopter with fossil fuel engine is associated with expensive operational cost, undesirable high level of noise and carbon emission.

As the traffic is increasing heavy in the global urban area, an affordable electrical VTOL vehicle is the solution to avoid the congestion on the road. Without traffic delay, an electrical VTOL vehicle can also operate as law enforcement vehicle, ambulance and medical cargo transporter. A new term UAM (urban air mobility) is adopted for this new type of aerial transportation.

Modern electrical VTOL vehicle with multiple rotary wings is known as multirotor vehicle. The multiple rotary wing system provides an agile steering capability and safe operation. The energy required for VTOL flight is significantly higher than the energy required for a fix wing airplane to maintain forward flight. Advantageously, modern electrical VTOL vehicle also has the capability to transition to airplane mode for forward flight. During forward flight, the VTOL vehicle is depending on the forward speed to generate lift from the fixed wings. Furthermore, the propulsive movement in the airplane mode is generated by a fixed push rotor or tiltable rotor.

Traditional fixed wing aircraft suffers from significant loses of lift efficiency at the tip of the wings, due to the occurrence of vortex. As a result, winglet, sharklet and box-wing design is introduced to improve lift efficiency.

A bigger challenge for VTOL vehicle to operates safety near the ground, by maintaining safe distance between the rotating blade and the person or object.

BRIEF SUMMARY OF THE INVENTION

In one embodiment of the invention a box-wing multirotor vehicle with both VTOL and airplane forward flight capability is provided, comprising a detachable cabin, a fuselage base having a longitudinal axis, fixed wings having a biplane arrangement, a pylon secured to the fixed wings at the tip, a pair of rudder, a pair of overhead boom, a pair of forward contra-rotating lift rotor, an tiltable lift and push rotor mechanically, a main landing gear pad or wheel, a horizontal and vertical stabilizer, a yaw servo tail boom, a rear contra-rotating lift rotor, and a nose landing gear pad or wheel.

Also in one embodiment the detachable cabin is separable from the box-wing multirotor vehicle for ground transportation. Also in one embodiment an overhead boom comprising of a plurality of lift rotors from the forward to the rear portion. Also in one embodiment the forward contra-rotating lift rotors and rear contra-rotating lift rotor exert firstly the lift needed for take-off, for landing, for hovering, and for flying vertically. Also in one embodiment the yaw servo tail boom directs thrust sideway to provide a complimentary control of the yaw heading. Also in one embodiment the tiltable lift and push rotor aiming in the downward position exerts complimentary lift needed for take-off, for landing, for hovering, for flying vertically. Also in one embodiment the tiltable lift and push rotor aiming in the aftward position provides the propulsive force for forward motion. Also in one embodiment the fixed wings provide the lift to the vehicle during forward flight. Also in one embodiment the rudder, elevator and aileron provide pitch, roll and yaw control during forward flight

BRIEF DESCRIPTION OF THE DRAWINGS

Regarding the invention disclosure, the feature and advantage of the invention are particularly pointed and distinctly claimed in the claims. Detailed description and methods are given to provide further comprehension of the functionality of the invention. It should be observed that three mutual orthogonal directions X, Y, and Z are shown in some of the FIGURES. The first direction X is said to be "longitudinal", and the forward side is referenced to be positive. Rotational movement around the longitudinal axis is said to be "roll". The second direction Y is said to be "transverse", and the port side is referenced to be positive. And the Y plane is referenced as centerline of the vehicle. Rotational movement around the transverse axis is said to be "pitch". Finally, the third direction Z is said to be "vertical", and the up side is referenced to be positive. Rotational movement around the vertical axis is said to be "yaw". Furthermore, the direction of motion is shown in dash arrow and axis of rotation is shown in dot dash line.

DETAILED DESCRIPTION OF THE EMBODIMENTS

Advantageously, VTOL (vertical take-off and landing) vehicle can operate without a long runway. However, VTOL operation requires significantly higher energy than the energy required for a fixed wing aircraft to maintain forward flight. Therefore, the usefulness of VTOL vehicle is limited to short range flight. Modern VTOL is commonly designed with electrical power plant. In order to reduce the weight of electrical energy storage, an efficient VTOL vehicle can adapt to airplane mode for long range forward fight. In the disclosure of the invention, the technical term rotary wing is referred as "rotor", and a rotary wing dedicated to generate lift is referred as "lift rotor".

Figure 1:
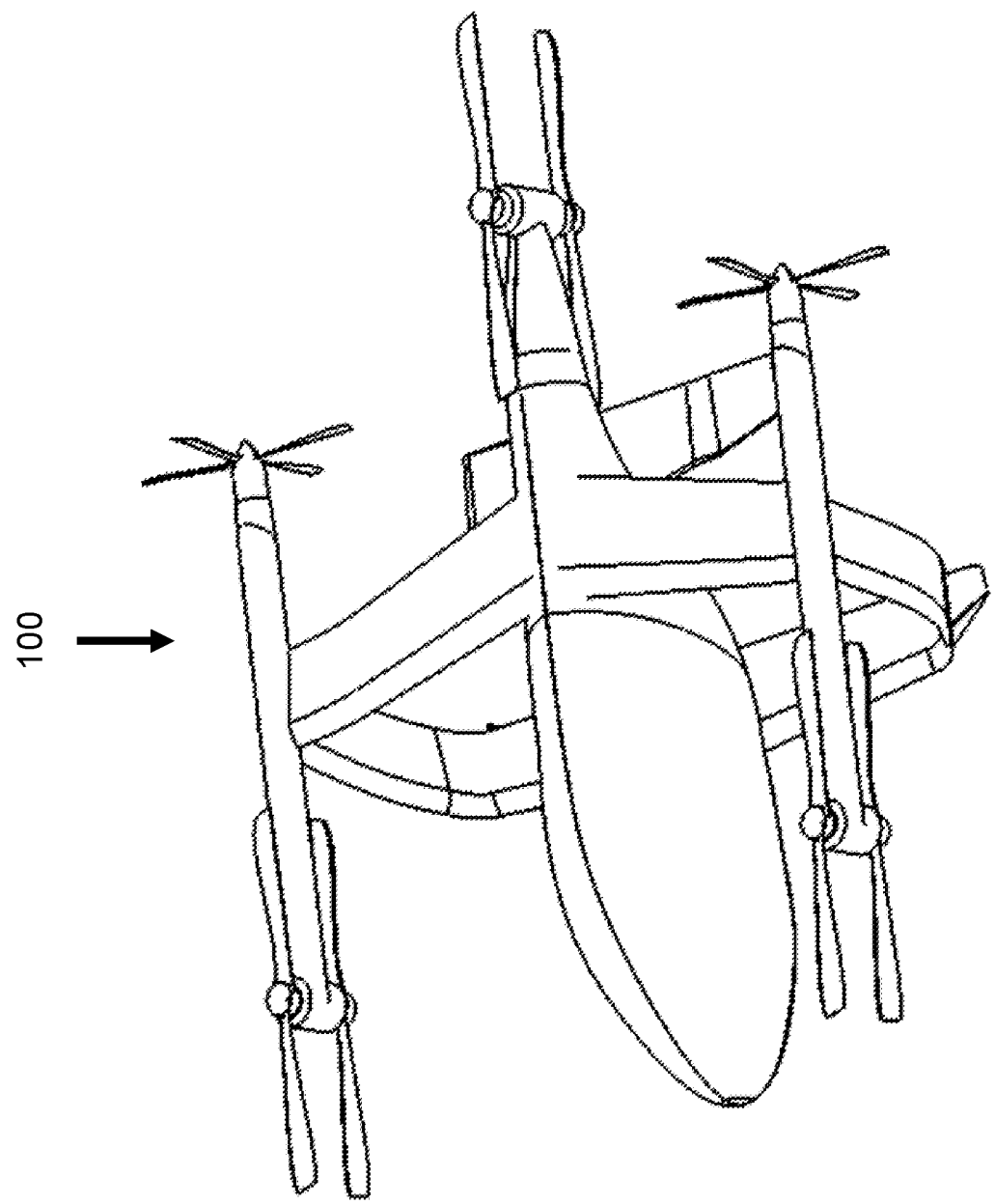
FIG. 1 is a perspective view of box-wing multirotor vehicle in forward flight configuration according to an embodiment of the present invention.
Figure 2:
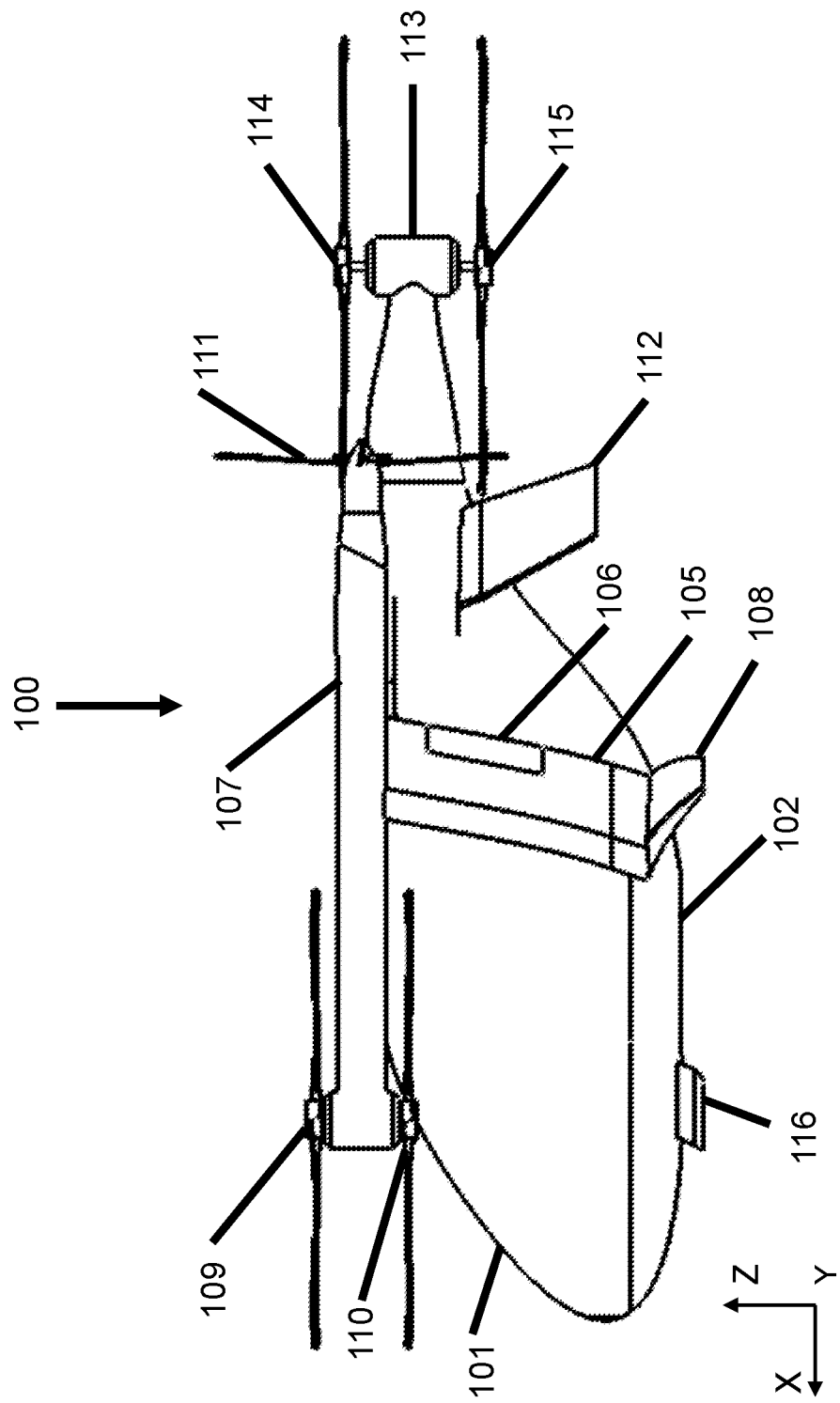
FIG. 2 is a side view of the box-wing multirotor vehicle of FIG. 1.

FIGS. 1 to 4 shows the embodiment of the present invention in forward flight configuration. FIG. 2 shows a side view of the embodiment. The aerial vehicle is shown in the usual way, the fuselage of the box-wing multirotor vehicle 100 comprises of a detachable cabin 101 and the fuselage base 102. The upper portion of the fuselage base 102 is provided with upper wing 103 and the lower portion of the fuselage base 102 is provided with lower wing 104 (Reference to FIG. 3). The upper wing 103 and lower wing 104 are joint at the tip by the pylon 105 to form the box-wing structure. The pylon 105 is provided with a heading control rudder 106. On the upper portion of the pylon 105 is provided with the overhead boom 107. On the lower portion of the pylon 105 is provided with the main landing gear pad 108. It can also be landing wheel. The forward portion of the overhead boom 107 is provided with the forward contra-rotating lift rotor, which comprises of the forward upper lift rotor 109 and forward lower lift rotor 110, and it may possibly be ducted fan. The rear portion of the overhead boom 107 is provided with the tiltable lift and push rotor 111, and it may possibly be ducted fan. In the rear portion of the fuselage base 102 is provided with the horizontal and vertical stabilizer 112. At the tail of the fuselage base 102 is provided with the yaw servo tail boom 113. The yaw servo tail boom 113 is provided with the rear contra-rotating lift rotor, which comprises of rear upper lift rotor 114 and rear lower lift rotor 115, and it may possibly be ducted fan. At the nose portion of the fuselage base 102 is provided with nose landing gear pad 116. It can also be landing wheel.

Figure 3:
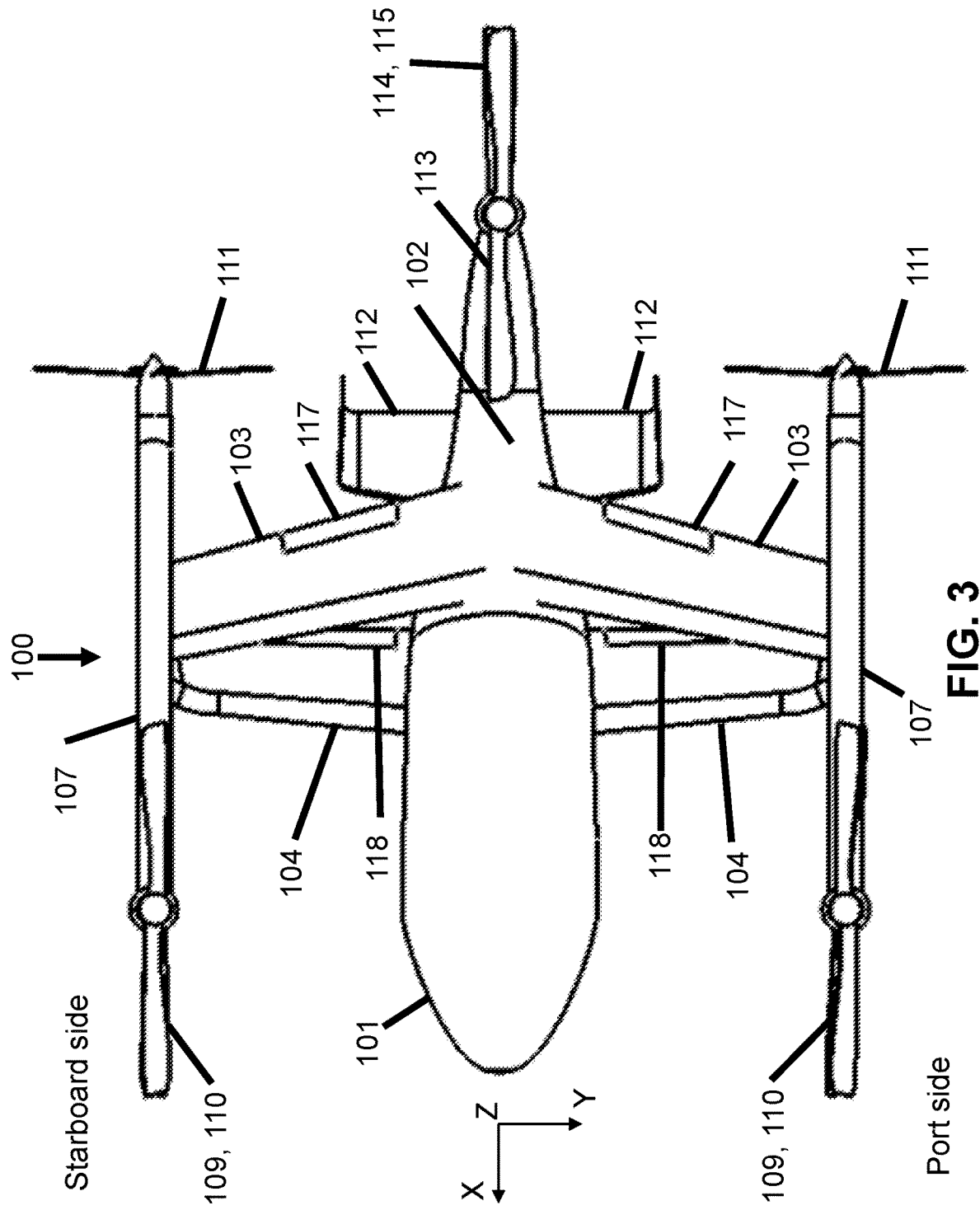
FIG. 3 is a top plan view of the box-wing multirotor vehicle of FIG. 1.

FIG. 3 shows the plane view of the embodiment. The wings of the box-wing multirotor vehicle 100 comprises of the articulated upper wing 103 sweeps forward from the top portion of the fuselage base 102. The upper wing 103 is provided with elevator 117. The articulated lower wing 104 sweeps aftward from the lower portion of the fuselage base 102. The lower wing 104 is provided with aileron 118. The wing can also be dihedral or anhedral. The opposite sweeps of the upper wing 103 and lower wing 104 permits optimum advantages of uniform air flow around the two main wings.

Figure 4:
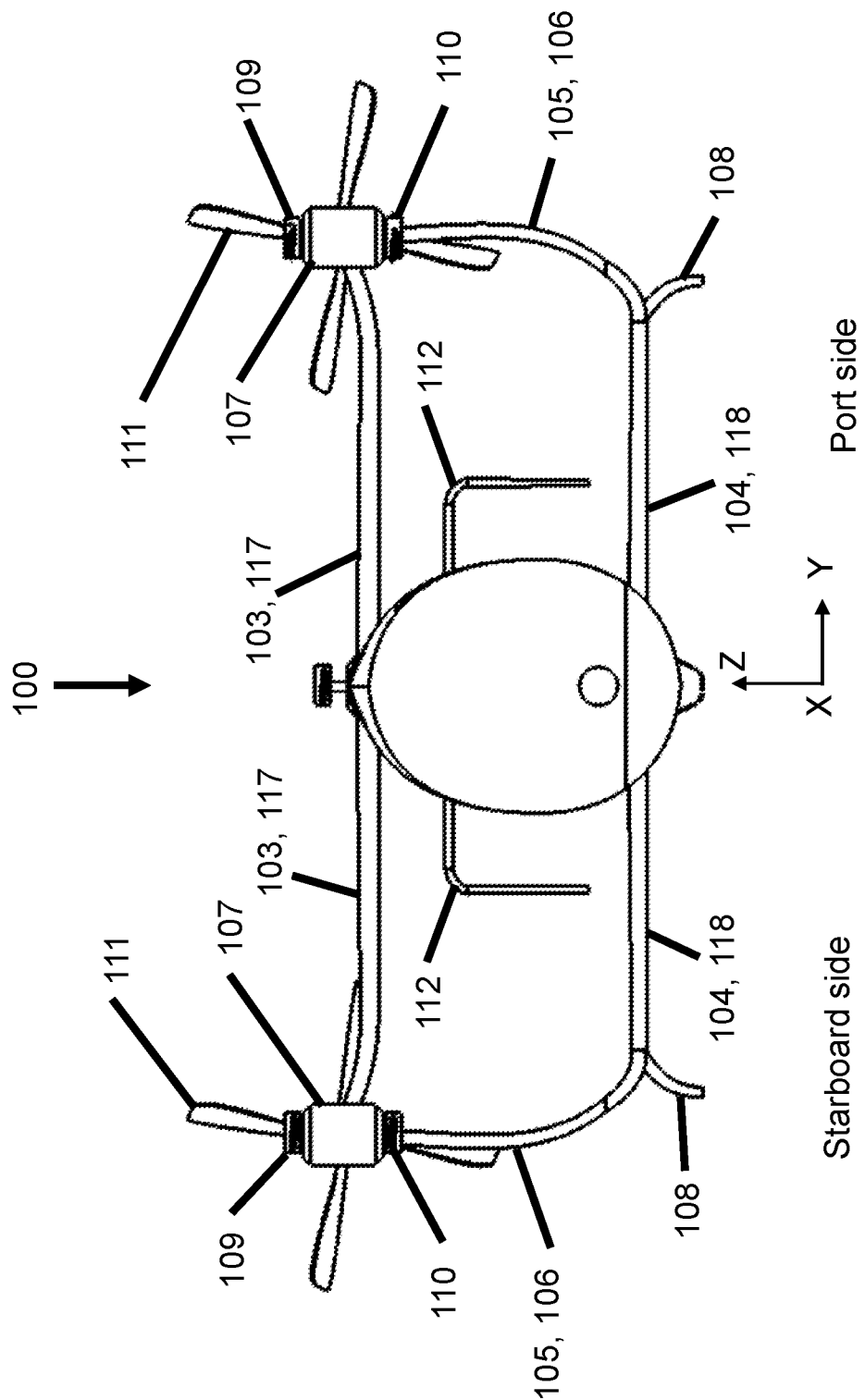
FIG. 4 is a frontal view of the box-wing multirotor of FIG. 1.

FIG. 4 shows the front view of the embodiment. It can be observed that the following components of the box-wing multirotor vehicle 100 are duplicated and symmetrical located on opposing sides of the Y plane. These components include the upper wing 103, lower wing 104, pylon 105, rudder 106, overhead boom 107, main landing gear pad 108, forward upper lift rotor 109, forward lower lift rotor 110, lift and push rotor 111, horizontal and vertical stabilizer 112, elevator 117 and aileron 118.

Figure 5:
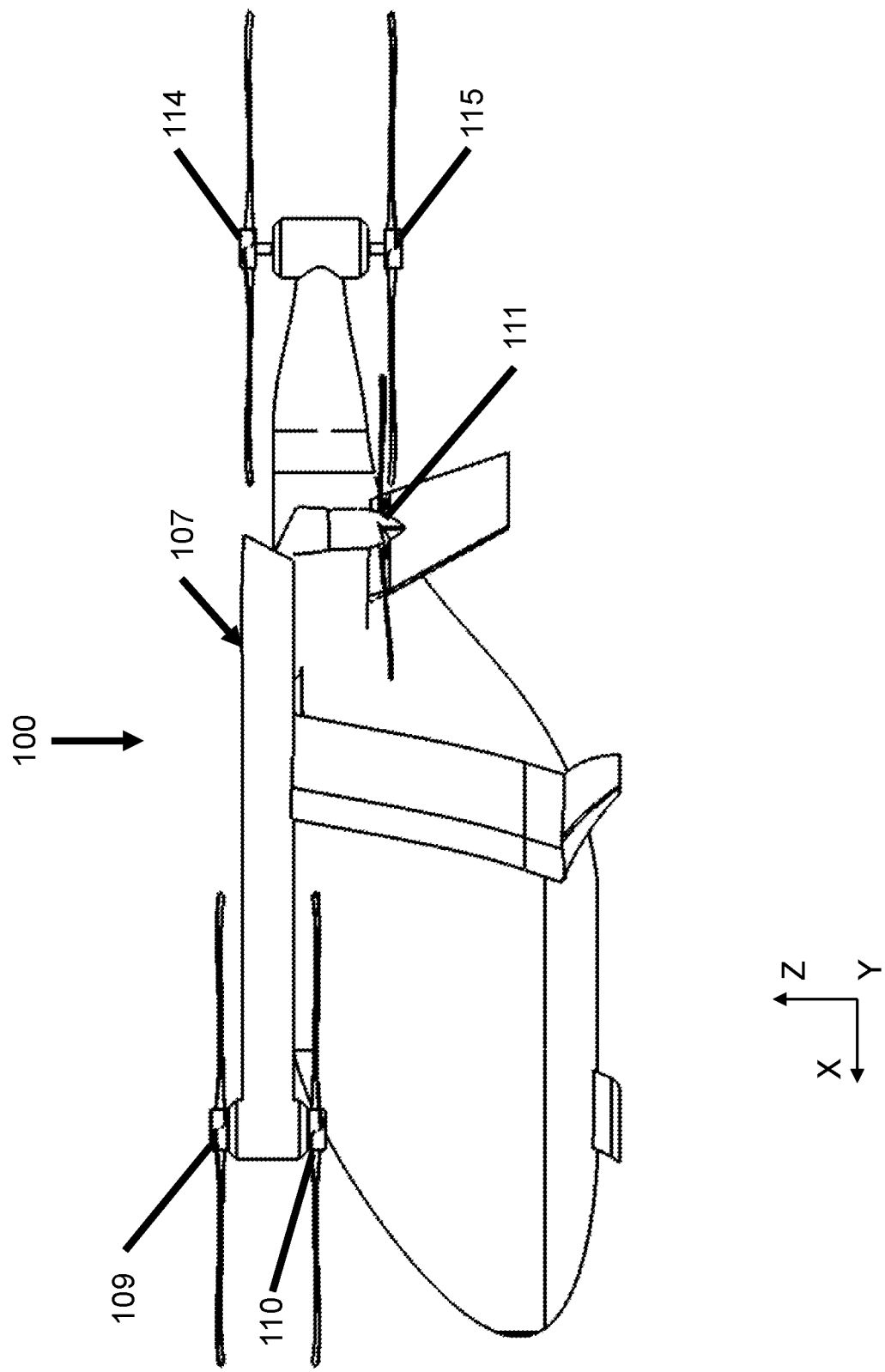
FIG. 5 is a side view of the embodiment of box-wing multirotor vehicle depicting the VTOL configuration.

FIG. 5 shows the embodiment of box-wing multirotor vehicle 100 in VTOL configuration. The side view shows the tiltable lift and push rotor 111 aiming at the downward direction to provide lift thrust. In detail, a mechanical system pivots the tiltable lift and push rotor 111 relatives to the overhead boom 107. Furthermore, in VTOL configuration, lift rotor 109, 110, 114 and 115 are powered to provide lift thrust.

Figure 6:
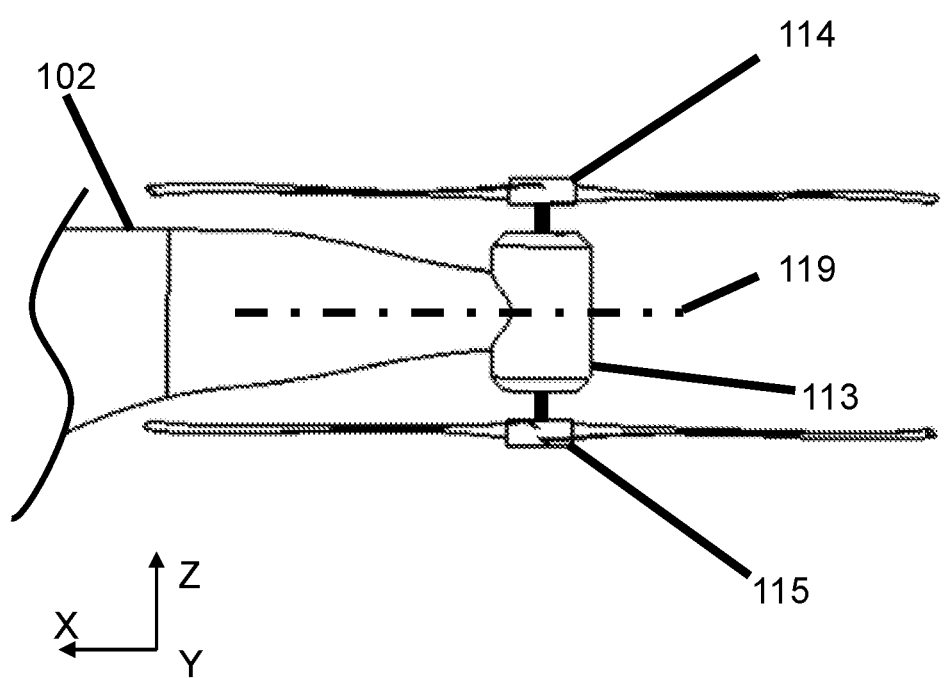
FIG. 6 is a side view of the embodiment of box-wing multirotor vehicle depicting the operation of the yaw servo tail boom.

FIG. 6 shows the side view of the embodiment of the yaw servo tail boom 113. Advantageously, the yaw servo tail boom 113 acts as a redundant flight control to assist the vehicle to change yaw heading. In detail, the yaw servo tail boom is mechanically coupled to the tail of the fuselage base 102. A rotating movement is applied to turn the yaw servo tail boom 113 on its own axis of rotation 119. As a result, the yaw servo tail boom 113 rotates around the roll axis relative to the fuselage base 102, therefore thrust is directed sideway to yaw the vehicle.

The operation of the box-wing multirotor vehicle 100 is descried in the following sections. Firstly, the box-wing multirotor vehicle 100 operates in the VTOL mode for taking-off, landing, hovering, and flying vertically. Secondly, the box-wing multirotor vehicle 100 operates in the fixed wing airplane mode for forward flight.

Advantageously in the VTOL mode, a plurality of independent electrical motors provides rotary movement to lift rotor 109, 110, 114 and 115. As a result, lift thrust is generated by the spinning lift rotor 109, 110, 114 and 115. Naturally, the lift forces propel the vehicle to taking-off, landing, hovering and flying vertically. Moreover, a mechanical system permits the tiltable lift and push rotor 111 to aim downward, therefore the produced thrust is also used for VTOL mode. The usage of tiltable lift and push rotor 111 is optional to increase the capacity of take-off payload or acts as redundant lift rotor. Firstly, the balance of thrust longitudinally and transversally allows the vehicle to fly levelly up and down in the Z axis. Secondly, an unbalance of thrust longitudinally allows the vehicle to pitch forward or aft, which allows the vehicle to fly forward and aftward. Finally, an unbalance of thrust transversally allows the vehicle to roll sideward, which allows the vehicle to fly side way. Optionally, the yaw servo tail boom 113 acts as a redundant flight control to assist the vehicle to change yaw heading.

Naturally, the torque effect of the rotor causes the vehicle to turn in the opposite direction of the rotor's spin. The lift rotor spins around the vertical axis, consequently the torque effect turns the yaw heading of the vehicle. Moreover, the magnitude of torque effect is proportional to the thrust produced by the rotor. In the case of the contra-rotating lift rotor, the torque effect is canceled out within every contra-rotating lift rotor. The dual lift and push rotors 111 are rotating in the opposite direction, therefore the torque effect is also cancelled out. As result, the vehicle maintains no yaw movement. In one aspect, the yaw heading adjustment is accomplished by increasing the thrust to the lift rotor spinning in one direction and reducing the thrust of the lift rotor spinning in the opposite direction. The unbalance of torque effect assists the vehicle to change yaw heading.

The operation of the box-wing multirotor vehicle 100 in airplane mode for forward flight is described in the following section. Firstly, after airborne, thrust produced by the tiltable lift and push rotor 111 is redirected to aim at the aftward direction, to propel the vehicle to the forward direction. Finally, until a cruising speed is reached, lift rotor 109, 110, 114 and 115 becomes unpowered, and the lift to maintain the vehicle airborne is provided solely by the wings. During airplane mode, the blade of lift rotor 109, 110, 114 and 115 are stowed in parallel with the longitudinal axis to reduce aerodynamic drag. Furthermore, the rudder 106, elevator 117 and aileron 118 provide the flight control capability to steer the vehicle in the pitch, roll and yaw axis. Moreover, horizontal and vertical stabilizer 112 provides directional stability for the vehicle.

Figure 7:
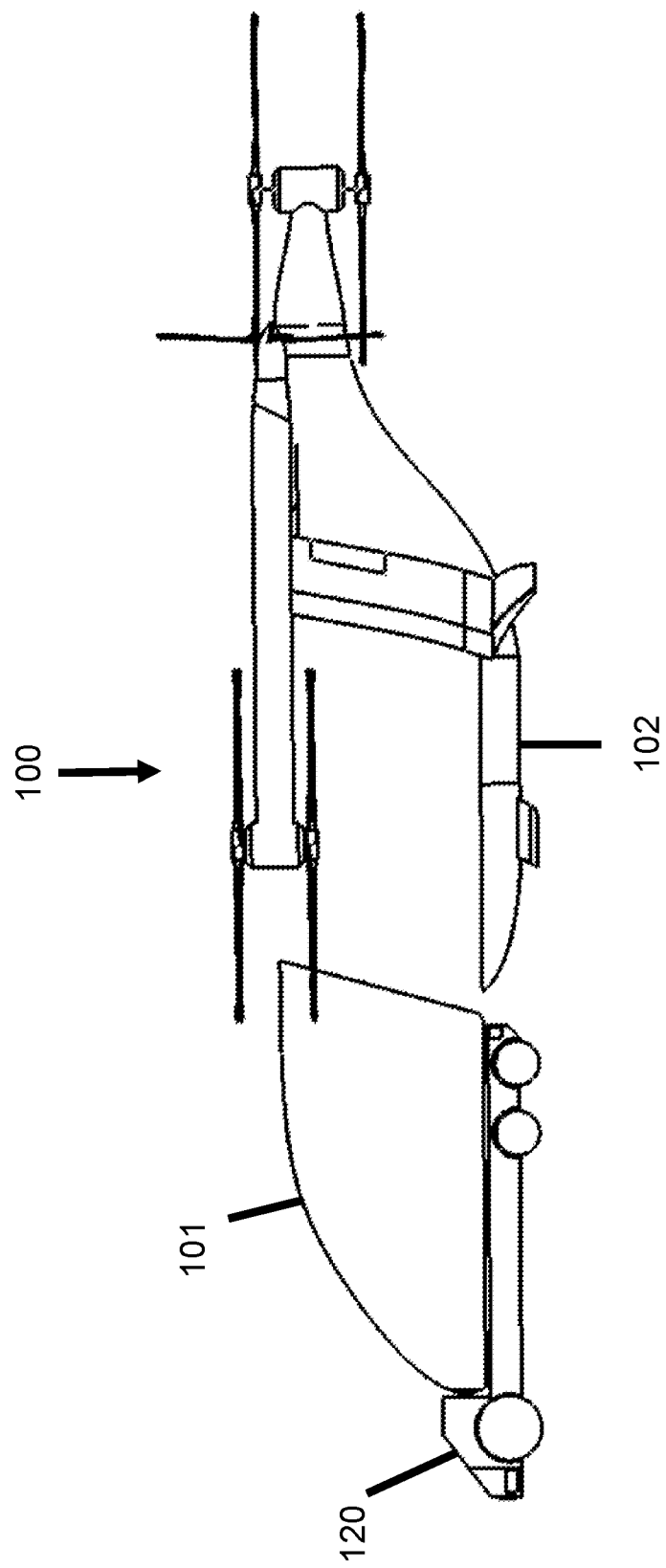
FIG. 7 is a side view of the embodiment of the box-wing multirotor vehicle depicting the capability of separating the cabin from the fuselage base.

FIG. 7 illustrates the embodiment of the detachable cabin 101 separated from box-wing multirotor vehicle 100. Firstly, in one aspect, a rail system between the detachable cabin 101 and fuselage base 102 allows the detachable cabin 101 to slide out from fuselage base 102. Secondly, upon separating from the fuselage base 102, the detachable cabin 101 can be to be loaded on the flat bed of a specialized ground car 120. As a result, this feature allows the payload to be hauled to the final destination without being unloaded from the detachable cabin 101. Advantageously, it allows quick change of payload between flight. The multirole cabin can accommodate payload such as passenger, cargo, energy storage and airborne equipment, but not limited to the described payload.

Naturally, there are numerous variations, modifications and configurations which may be made hereto without departing from the scope of the disclosure invention. It should be understood that the embodiments are for illustrative and explanatory purpose and it is not conceivable to identify exhaustively all possible embodiments. In particular, it is important to observe that the invention as described relates in particular to an aerial multirotor vehicle with lift rotors secured to the box-wing. The design of the box-wing benefits from an improvement of structural strength, fatigue strength and load carrying strength. The box-wing permits the lift rotors to be secured to the upper portion of the vehicle, which prevents the rotating blade from striking a person or object near the ground. Finally, the box-wing with a plurality of main wings design permits the wing span to be reduced in the transverse direction. Nevertheless, the invention is applicable to any multirotor vehicle of arbitrary weight, such as a light drone to a large tonnage vehicle.

What is claimed is:

1. A box-wing multirotor aerial vehicle adapted for VTOL comprising:
   a fuselage, said fuselage comprising:
      a detachable cabin; a nose portion; a lower portion; an upper portion; and a rear portion;
   a fixed box-wing, said fixed box wing comprising:
      a port side fixed box-wing structure, said port side fixed wing structure comprising:
         a stagger biplane arrangement comprising of a port side upper wing transversally extended from said upper portion of said fuselage; a port side lower wing transversally extended from said lower portion of said fuselage; wherein said port side upper wing and said port side lower wing are spaced apart longitudinally and vertically; wherein said port side upper wing and said port side lower wing have an articulated swept on the vertical and horizontal direction; and wherein said port side upper wing and said port side lower wing are joint at the distal end by a port side pylon;
      a starboard side fixed box-wing structure, said starboard side fixed wing structure comprising:
         a stagger biplane arrangement comprising of a starboard side upper wing transversally extended from said upper portion of said fuselage; a starboard side lower wing transversally extended from said lower portion of said fuselage; wherein said starboard side upper wing and said starboard side lower wing are spaced apart longitudinally and vertically; wherein said starboard side upper wing and said starboard side lower wing have an articulated swept on the vertical and horizontal direction; and wherein said starboard side upper wing and said starboard side lower wing are joint at the distal end by a starboard side pylon;
   a port side rudder is disposed on said port side pylon;
   a starboard side rudder is disposed on said starboard side pylon;
   a port side elevator is disposed on said port side upper wing;
   a starboard side elevator is disposed on said starboard side upper wing;
   a port side aileron is disposed on said port side lower wing;
   a starboard side aileron is disposed on said starboard side lower wing;
   a port side overhead boom, said port side overhead boom comprising:
      a middle portion secured to at least one or more of said port side upper wing, said port side lower wing, and said port side pylon;
      a forward portion mounted with a port side forward contra-rotating lift rotor;
      a rear portion mechanically coupled to a port side tiltable lift and push rotor;
   a starboard side overhead boom, said starboard side overhead boom comprising:
      a middle portion secured to at least one or more of said starboard side upper wing, said starboard side lower wing, and said starboard side pylon;
      a forward portion mounted with a starboard side forward contra-rotating lift rotor;
      a rear portion mechanically coupled to a starboard side tiltable lift and push rotor;
   a port side main landing gear secured to said port side pylon;
   a starboard main landing gear secured to said starboard side pylon;
   a horizontal and vertical stabilizer comprising of at least one or more of fixed horizontal airfoil and fixed vertical airfoil secured on opposing sides of said rear portion of said fuselage;
   a yaw servo tail boom mechanically coupled to said rear portion of said fuselage;
   a rear contra-rotating lift rotor mounted to said yaw servo tail boom; and
   a landing gear secured to said nose portion of said fuselage.

2. The box-wing multirotor vehicle as set forth in claim 1, wherein said detachable cabin is separable from said fuselage by sliding forward on an integrated rail system to be loaded on a ground transportation device.

3. The box-wing multirotor vehicle as set forth in claim 1, wherein said detachable cabin comprising the usage to hold passenger, cargo, equipment and energy storage.

4. The box-wing multirotor vehicle as set forth in claim 1, wherein said port side forward contra-rotating lift rotor, said starboard side forward contra-rotating lift rotor, and said rear contra-rotating lift rotor exert a primary lift for taking-off, landing, hovering and flying vertically, and the torque effect yaw heading.

5. The box-wing multirotor vehicle as set forth in claim 1, wherein said port side tiltable lift and push rotor along with said starboard side tiltable lift and push rotor aiming in the downward position exerts a secondary lift needed for take-off, for landing, for hovering, for flying vertically.

6. The box-wing multirotor vehicle as set forth in claim 1, wherein said port side tiltable lift and push rotor along with said starboard side tiltable lift and push rotor aiming in the aftward position provides a propulsive thrust for forward motion.

7. The box-wing multirotor vehicle as set forth in claim 1, wherein said fixed box-wing provides lift during forward flight.

8. The box-wing multirotor vehicle as set forth in claim 1, wherein said rudders, said elevators and said ailerons provide pitch, roll and yaw control during forward flight.

9. The box-wing multirotor vehicle as set forth in claim 1, wherein said detachable cabin mounted over said lower portion of said fuselage.

10. The box-wing multirotor vehicle as set forth in claim 1, wherein said fuselage on ground is supported by said port side main landing gear, said starboard side main landing gear and said nose landing gear.

11. The box-wing multirotor vehicle as set forth in claim 1, wherein said fixed box-wing is the structural support between said port side main landing gear and said starboard side main landing gear to said fuselage on ground.

12. The box-wing multirotor vehicle as set forth in claim 1, wherein said fixed box-wing, said lower portion of said fuselage and said upper portion of said fuselage are integral inseparable structure.

* * * * *